United States Patent
Day et al.

(10) Patent No.: US 6,658,499 B1
(45) Date of Patent: Dec. 2, 2003

(54) SYSTEM AND METHOD FOR ADSL USB BANDWIDTH NEGOTIATION

(75) Inventors: Robert A. Day, Manalapan, NJ (US); Kamran Khederzadeh, League City, TX (US); Kamal Patel, Edison, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 441 days.

(21) Appl. No.: 09/815,509

(22) Filed: Mar. 23, 2001

Related U.S. Application Data

(60) Provisional application No. 60/191,666, filed on Mar. 23, 2000.

(51) Int. Cl.⁷ ............................................... G06F 13/10
(52) U.S. Cl. ............................... 710/8; 710/10; 710/14; 710/15; 710/16; 710/17
(58) Field of Search .......................... 710/8, 10, 14–17, 710/62, 104, 305, 306; 375/222; 370/419, 420, 465; 379/93.01; 709/223, 226–229, 250; 713/1, 100

(56) References Cited

U.S. PATENT DOCUMENTS

| | | | |
|---|---|---|---|
| 5,848,266 A | * 12/1998 | Scheurich | 713/503 |
| 6,252,886 B1 | * 6/2001 | Schwager et al. | 370/443 |
| 6,523,081 B1 | * 2/2003 | Karlsson et al. | 710/305 |
| 6,539,450 B1 | * 3/2003 | James et al. | 710/306 |
| 6,590,865 B1 | * 7/2003 | Ibaraki et al. | 370/230 |

* cited by examiner

*Primary Examiner*—Ilwoo Park
(74) *Attorney, Agent, or Firm*—Thomas, Kayden, Horstemeyer & Risley

(57) ABSTRACT

A system and method for ADSL USB bandwidth negotiation are presented. The system comprises a modem that is configured to transfer data between an ADSL line and a USB bus and that is further configured to receive an ADSL line rate setting, submit an isochronous bandwidth request to a computer, reduce the isochronous bandwidth request in response to the availability of isochronous bandwidth, modify the ADSL line rate setting in response to the availability of isochronous bandwidth, and modify the USB bus transfer mode in response to the availability of isochronous bandwidth. The method comprises steps of receiving an ADSL line rate setting, submitting an isochronous bandwidth request to a computer, reducing the isochronous bandwidth request in response to the availability of isochronous bandwidth, modifying the ADSL line rate setting in response to the availability of isochronous bandwidth, and modifying the USB bus transfer mode of the ADSL USB modem in response to the availability of isochronous bandwidth.

27 Claims, 6 Drawing Sheets

SYSTEM AND METHOD FOR ADSL USB BANDWIDTH NEGOTIATION

CROSS-REFERENCE TO RELATED APPLICATION

The present application claims the benefit of U.S. provisional patent application, issued Ser. No. 60/191,666, and filed Mar. 23, 2000, which is hereby incorporated by reference in its entirety.

FIELD OF THE INVENTION

The present invention generally relates to customer premises equipment ("CPE") asymmetric digital subscriber line ("ADSL") modems. More specifically, the invention relates to CPE ADSL universal serial bus ("USB") modems.

BACKGROUND OF THE INVENTION

ADSL USB modems utilize some of the latest advances in computer interface and telecommunications technology. ADSL is a form of DSL (digital subscriber line) technology that is typically utilized for Internet access because of its fast downstream data transmission characteristic. One significant benefit of certain types of DSL technology, such as ADSL, is that it can be conducted over existing telephone lines by using higher frequency signals than common voice-band signals. Thus, in an ADSL application, a telephone line can be utilized as the common, simultaneous transmission medium for Internet data and voice-band data.

USB is a hardware interface technology that offers the capability to connect multiple devices ("USB devices") to a computer, such as a personal computer ("PC") or network server, via a common bus (a "USB bus"). Many computers are now produced with USB capability, and many computer peripherals are now produced to operate as USB devices, for example, printers, modems, and digital cameras. One significant benefit obtained by the use of USB technology is "hot-swap" capability, that is, the capability to connect or disconnect USB devices from a computer while its operating system is active. Further, USB devices can be installed without physically making internal access to the computer (e.g., to access a card slot), since the USB bus provides a means for external connections to the computer. Thus, the combination of ADSL and USB technology in a modem implementation can offer significant benefits for the transfer of data between a computer and a telecommunications network.

An ADSL USB modem is a CPE (customer premises equipment) ADSL modem that connects to a computer that has a USB bus. In an ADSL USB network, the ADSL line and the USB bus are the two links that have variable bandwidth (i.e., data transmission capacity). FIG. 1 shows a block diagram of a typical ADSL USB network 100, as is known in the prior art. The network 100 includes several elements. A DSL access multiplexer (DSLAM) 102, typically located at a telephone company central office (CO), intermixes voice signals and data signals (e.g., Internet data) that are transmitted to a customer premises (CP) via the local loop of an ADSL line 108. An ADSL USB modem 104 interfaces the ADSL line 108 to a USB bus 110. A computer 106 connects to the ADSL USB modem 104 via the USB bus 110 and typically transceives data signals with the DSLAM 102. Although not shown, other CPE devices capable of transceiving voice or data signals may also be connected to the ADSL line 108 in the network 100. Furthermore other CPE USB devices (not shown) may be connected to the computer 106 via the USB bus 110.

In a typical communications network, such as the ADSL USB network 100, there may be several other components that are intermediate between the DSLAM 102 and the local loop of an ADSL line 108, for example, a main distribution frame (MDF). In FIG. 1 as well as in subsequent figures that are applicable, the existence of such components is acknowledged by a break in the ADSL line 108 between the DSLAM 102 and the ADSL USB modem 104. Such additional components will not be shown in the figures or be described since the discussion of them is not needed to facilitate the description of the present invention.

As previously mentioned, the ADSL line and the USB bus are the two links in an ADSL USB network, such as the network 100 of FIG. 1, that have variable bandwidth. For example, in a typical ADSL USB network, the data rate (i.e., the data transmission speed) of the ADSL line can be described by the following relational equation: 32 Kbps$\leq$Data Rate$\leq$8.192 Mbps, where Kbps is kilo-bits per second and Mbps is mega-bits per second. It is noted that the actual data rate of a given: ADSL line is dependent on several factors, including line quality and level of service, and a data rate above the typical 8.192 Mbps may be available in some networks. Furthermore, the available bandwidth on a given isochronous (i.e., time dependent) channel of the USB bus in a typical ADSL USB network can be described by the following relational equation: 0 bps$\leq$Available Bandwith$\leq$8.184 Mbps. It is noted that the actual isocohronous bandwidth available on a given channel is dependent on several factors, including the number of USB devices connected to the USB bus. From the two relational equations above, it can be seen that it is possible for the ADSL line data rate to exceed the available USB bus bandwidth.

In order for the end-to-end system of an ADSL line and a USB bus to operate efficiently, a certain relationship must be maintained between them. Specifically, the USB bus bandwidth that is allocated to the interfacing ADSL USB modem must be somewhat greater than the ADSL line data rate If this relationship is not maintained, data being transmitted to the computer via the ADSL USB network (e.g., network 100 of FIG. 1) will eventually overflow the ADSL USB modem buffer and be lost, an event commonly referred to in the art as "bottle-necking". When such an event occurs, the upper layer protocols, such as TCP/IP (Transmission Control Protocol/Internet Protocol), will detect an error and request re-transmission, resulting in degraded system throughput.

An important aspect of a USB bus, as previously mentioned, is that it can be shared to connect multiple USB devices to a computer. There are several data transfer modes that can be implemented to transfer data over a USB bus. Three of these modes, bulk, interrupt, and isochronous, are typically very applicable for high bandwidth USB devices (i.e., devices that consume a large portion of the total USB bandwidth). In practice, such devices include those that operate in the 0.5 Mbps to 8 Mbps range. In this regard, FIGS. 2A–2C show illustrations of typical signal formats for bulk, interrupt, and isochronous transfer modes, as are known in the prior art.

FIG. 2A shows an illustration of a typical bulk transfer mode signal format 200, as is known in the prior art. The bulk mode format 200 includes token packets 202, 206, data packets 203, 207, and hand-shake packets 204, 208. Each packet is identified by a packet ID (PID). For example, token packet 202 has an "IN" PID which identifies the packet as input token packet (i.e., from a USB device to the computer) and token packet 206 has an "OUT" PID which identifies the packet as output token packet (i.e., from the computer to a USB device). As shown in FIG. 2A, other PID's exist to identify packets in the bulk mode format 200, but further discussion of such PID's is not necessary for the description of the present invention. FIG. 2B shows an illustration of a typical interrupt transfer mode signal format 210, as is known in the prior art. Similar to the bulk mode format 200 (FIG. 2A), the interrupt mode format 210 includes a token packet 211, a data packet 212, and a hand-shake packet 213. In an early version of the interrupt mode format 210, only input token packets are available (as shown), but later versions may also have output token packets as well. Finally, FIG. 2C shows an illustration of a typical isochronous transfer mode format 220, as is known in the prior art. As is shown, the isochronous mode format is different from the bulk mode 200 or interrupt mode 210 formats. This is because isochronous transfer mode is time-dependent. Thus, the isochronous mode format 220 has only a token packet 221 and a data packet 222 to give it less signal overhead.

Isochronous transfer mode differs from bulk or interrupt transfer modes (which, as stated above, are quite similar) in the way that transfers are scheduled by the computer and in the amount of protocol overhead that transfers incur. Bandwidth for isochronous mode transfers is allocated by the system from a fixed pool of 1023 bytes per each 1 millisecond USB frame. Once isochronous bandwidth is assigned to a particular USB device, the allocation is essentially guaranteed to the extent possible, and isochronous transfers have the lowest protocol overhead. In contrast, bandwidth for bulk or interrupt mode transfers is not assigned or guaranteed. These transfers are dynamically scheduled on a per frame basis and obtain whatever amount of bandwidth that is available. In this regard, FIG. 2D shows a typical USB frame format 230, as is known in the prior art. As is shown, the USB frame 230 has a 1 millisecond time length. The USB frame 230 includes a start-of-frame (SOF) 231, isochronous data 232, interrupt data 233, bulk data 234, where this data corresponds to signal formats of FIGS. 2A–2C described above.

Existing implementations of ADSL USB modems use bulk transfer mode for downstream data transmission (i.e., from a DSLAM to a computer). It is believed that one reason bulk transfer mode is used in existing implementations is an effort to provide the highest probability of inter-operation with other USB devices connected to the USB bus. However, this use of bulk transfer mode poses at least one significant problem to the efficient operation of an ADSL USB network. There is a possibility of data arriving from a DSLAM at a rate higher than can be delivered over the USB bus by the ADSL USB modem. This is because when multiple USB devices are connected to a computer via a USB bus by implementing bulk transfer mode, the bandwidth available to any given device is not guaranteed and is not even known prior to a transfer. Thus, the problem of data loss and loss of throughput may occur unpredictably in existing implementations of ADSL USB modems when the ADSL line bandwidth exceeds the USB bus bandwidth during downstream data transmission. This problem can be partially resolved with the use of a larger system receive buffer at the ADSL USB modem. However, the addition of a larger buffer increases the cost of the system and causes increased latency (i.e., delay of data transfer), which in some situations can also degrade system throughput. Furthermore, the use of a larger buffer can not ensure the prevention of data loss in the event that the long-term average data receive-rate by the modem is too high.

Therefore, there is a need for a system and method to manage the ADSL USB bandwidth negotiation of an ADSL USB modem to prevent data transfer events where the ADSL line data rate exceeds the USB bus bandwidth thereby resulting in data loss and loss of throughput (i.e., bottle-necking). Furthermore, there is a need for such a system and method that can be provided at an economic cost and that does not cause increased latency in the ADSL USB network.

SUMMARY OF THE INVENTION

Certain objects, advantages, and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve various objects and advantages, the present invention is directed to a novel system and method for ADSL USB bandwidth negotiation of an ADSL USB modem. Broadly, the present invention manages the ADSL USB bandwidth negotiation of a modem to prevent data loss and throughput loss that results from the ADSL line data rate exceeding the USB bus bandwidth during data transfers in an ADSL USB network. In accordance with a preferred embodiment of the present invention, a system is provided for the negotiation of ADSL and USB bandwidth in an ADSL USB network that includes a modem that is configured to transfer data between an ADSL line and a USB bus. Further, the modem is configured to receive an ADSL line rate setting, submit an isochronous bandwidth request to a computer, reduce the isochronous bandwidth request in response to the availability of isochronous bandwidth, modify the ADSL line rate setting in response to the availability of isochronous bandwidth, and modify the USB bus transfer mode in response to the availability of isochronous bandwidth.

In accordance with another preferred embodiment of the present invention, a method for ADSL USB bandwidth negotiation by an ADSL USB modem is provided that includes the step of receiving an ADSL line rate setting. Further, the method includes the steps of submitting an isochronous bandwidth request to a computer, reducing the isochronous bandwidth request in response to the availability of isochronous bandwidth, modifying the ADSL line rate setting in response to the availability of isochronous bandwidth, and modifying the USB bus transfer mode of the ADSL USB modem in response to the availability of isochronous bandwidth.

One advantage of a preferred embodiment of the present invention is that it prevents data loss and throughput loss that results from the ADSL line data rate exceeding the USB bus bandwidth during data transfers in an ADSL USB network, a phenomena also known as bottle-necking. Another advantage of a preferred embodiment of the present invention is that it provides a system and method that prevents bottle-necking in ADSL USB network at an economic cost and without causing increased latency in the ADSL USB network.

Other objects, features, and advantages of the present invention will become apparent to one skilled in the art upon examination of the following drawings and detailed description. It is intended that all such additional objects, features, and advantages be included herein within the scope of the present invention, as defined by the claims.

BRIEF DESCRIPTION OF THE DRAWINGS

The present invention will be more fully understood from the detailed description given below and from the accompanying drawings of a preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENTS

Figure 1:
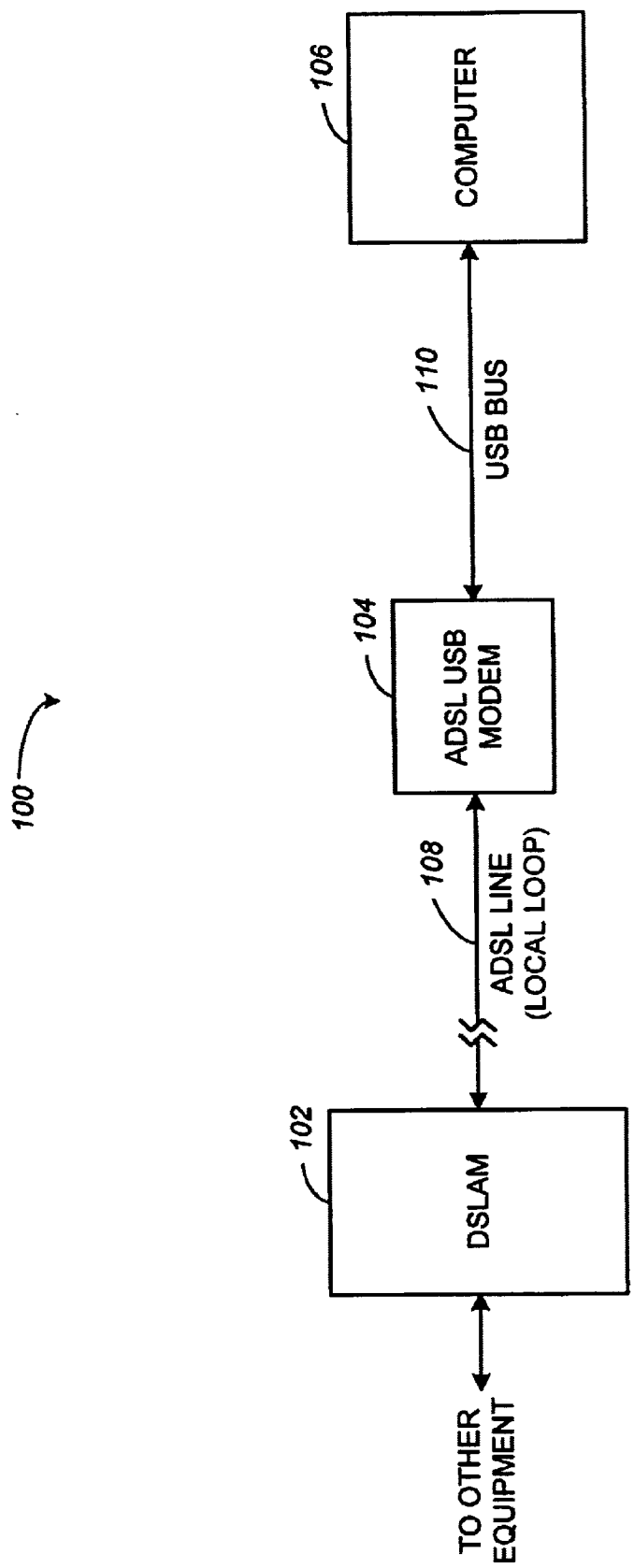
FIG. 1 is a block diagram of a typical ADSL USB network, as is known in the prior art.
Figure 2A:
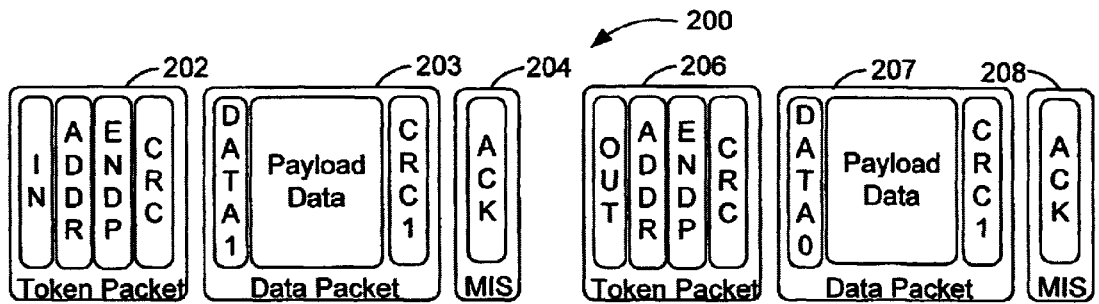
FIGS. 2A–2C are illustrations of typical signal formats for bulk, interrupt, and isochronous transfer modes, as are known in the prior art.
Figure 2B:
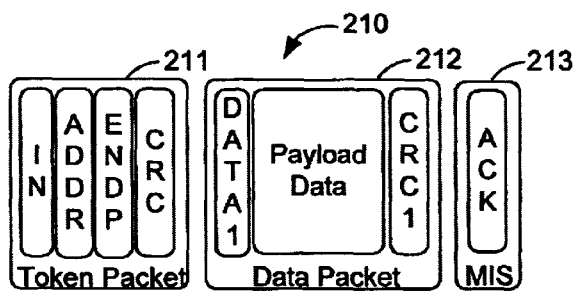
Figure 2C:
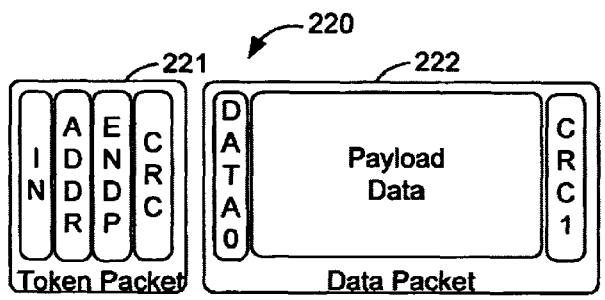
Figure 2D:
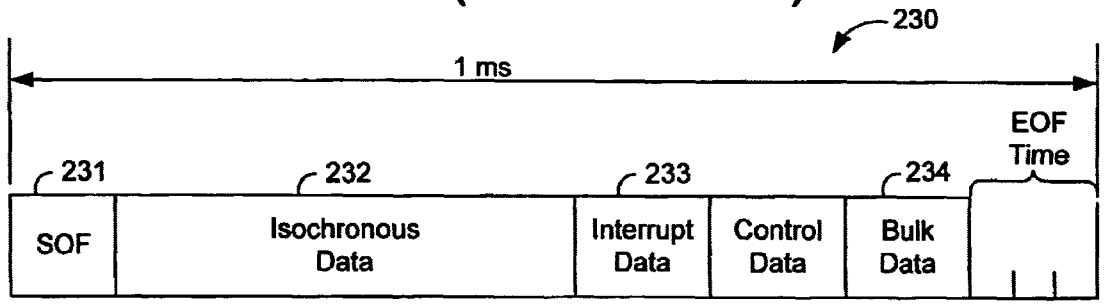
FIG. 2D is an illustration of a typical USB frame format, as is known in the prior art.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims. Indeed, the present invention is believed to be applicable to a variety of systems, devices, and technologies.

Figure 3:
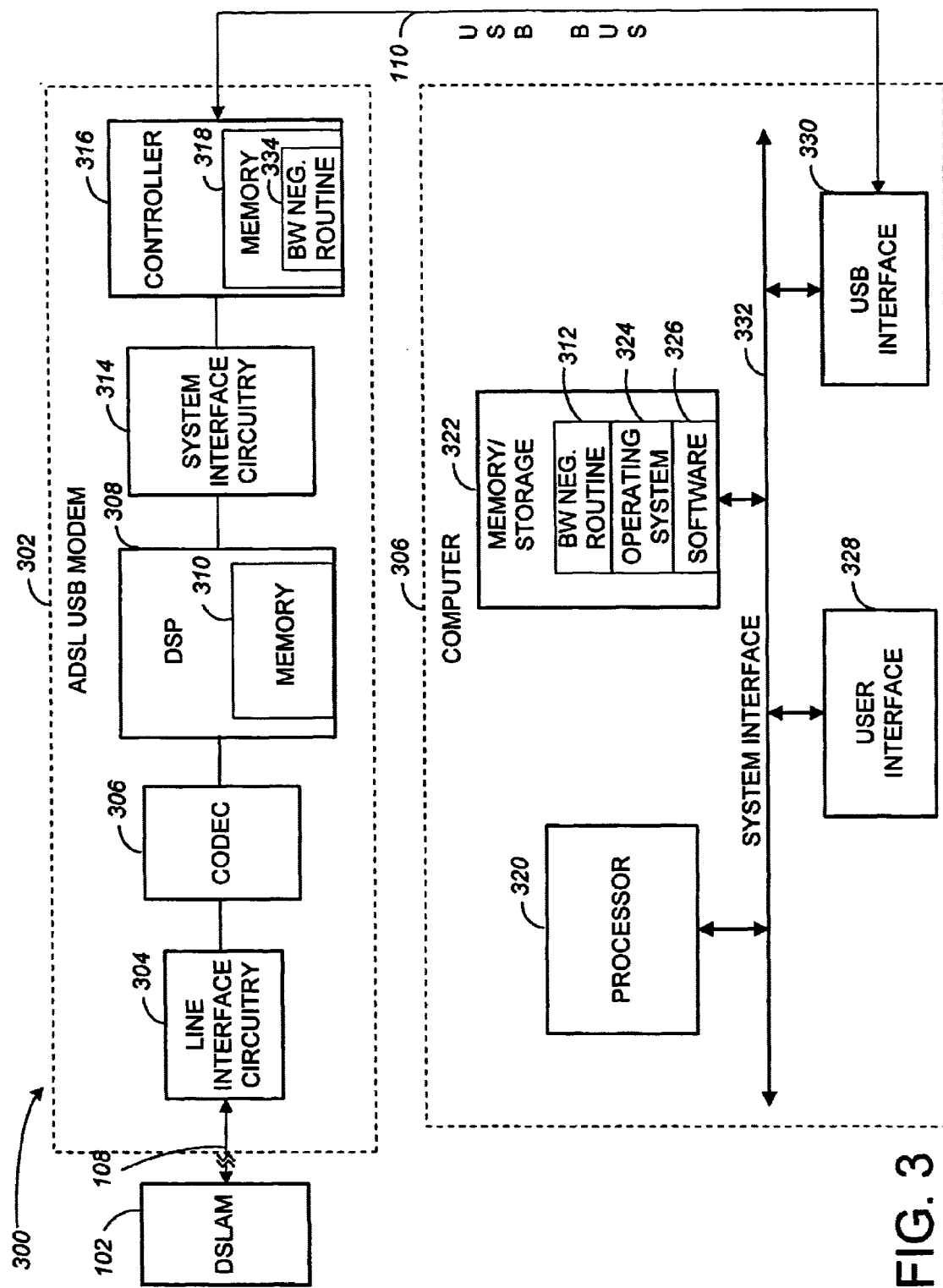
FIG. 3 is a block diagram of an ADSL USB network in accordance with a preferred embodiment of the present invention.

Turning now to the drawings, wherein like referenced numerals designate corresponding parts throughout the drawings, FIG. 3 shows a block diagram of an ADSL USB network 300 in accordance with a preferred embodiment of the present invention. In this regard, the ADSL USB network 300 has similar components to the ADSL USB network 100 (FIG. 1). That is, the network 300 comprises a DSLAM 102, typically located at a central office (CO), an ADSL USB modem 302, and a computer 306, both typically located at a customer premises (CP). Communicatively connecting the DSLAM 102 to the ADSL USB modem 302 is an ADSL line 108. Furthermore, communicatively connecting the ADSL USB modem 302 to the computer 306 is a USB bus 110.

But, the ADSL USB modem 302 of the ADSL USB network 300 is configured to manage the ADSL USB bandwidth negotiation in accordance with a preferred embodiment of the present invention. In this regard the ADSL USB modem 302 comprises line interface circuitry 304. The line interface circuitry 304 may include such components (not shown) as a line driver and a hybrid, which are known in the art. The modem 302 also comprises a coder-decoder (CODEC) 306. The CODEC 306 may include such components (not shown) as a digital-to-analog converter (D/A) and an analog-to-digital converter (AID), which are known in the art. The modem 302 further comprises digital signal processing circuitry (DSP) 308. The DSP 308 includes a memory 310 and is known in the art. This memory 310 may contain various logic (not depicted) that controls the operation of the modem 302, and in one embodiment of the present invention, the memory 310 may contain logic that performs functions relevant to the ADSL USB bandwidth negotiation of the modem 302 which will be described in more detail below.

Finally, the modem 302 also comprises system interface circuitry 314 and a controller 318. The system interface circuitry 314 operates to interface data signals that are transferred between the DSP 308 and the controller 316. The controller 316 operates to manage the utilization of the USB bus 110 which interfaces the modem 302 to the computer 306. The controller 316 includes a memory 318. in accordance with one embodiment of the present invention, the memory 318 contains a bandwidth negotiation routine 334 that functions to manage the bandwidth negotiation of the modem 302 between the bandwidth (i.e., the data rate) allocated by the DSLAM 102 to the ADSL line 108 and the bandwidth allocated by the computer 306 to the USB bus 110.

Continuing with reference to FIG. 3, it will be shown below that in contrast to the computer 106 of FIG. 1, the computer 306 is also configured to manage the ADSL USB bandwidth negotiation in accordance with a preferred embodiment of the present invention. The computer 306, as stated above, is communicatively connected to the ADSL USB modem 302 via the USB bus 110. Specifically, at the computer 306, the USB bus 110 is communicatively connected to the computer 306 through USB interface circuitry 330. As shown, the USB interface circuitry 330 interfaces the USB bus 110 to the system interface bus 332 of the computer 306. It is noted that the block diagram of the computer 306 is simplified to only show certain main components in order to facilitate the description of the present invention. In this regard, the computer 306 has a processor 320 that is also in communications with the system interface bus 332. As is known in the art, the processor 320 is responsible for the overall computational processes of the computer 306.

Also in communications with the system interface 332 is user interface circuitry 328. As is known in the art, the user interface circuitry 328 may include various user peripherals (not shown) such as a keyboard or touch-pad device and the controlling hardware that may be internal to the computer 306. It is noted that various user peripherals may also interface to the computer 306 via the USB bus 110 if they are configured to do so. As will be described below, data that is input via the user interface 328 may be applied to the management of ADSL USB bandwidth negotiation in accordance with a preferred embodiment of the present invention.

As is also known in the art, the computer 306 includes memory/storage circuitry 22. In distinction to the computer 106 of FIG. 1, contained within the memory/storage 322 of the computer 306 is an ADSL USB bandwidth negotiation routine 312 in accordance with a preferred embodiment of the present invention. The bandwidth negotiation routine 312 stored in the memory/storage 322 functions to manage the bandwidth negotiation of the modem 302 between the bandwidth (i.e., the data rate) allocated by the DSLAM 102 to the ADSL line 108 and the bandwidth allocated by the computer 306 to the USB bus 110. This bandwidth negotiation management ensures the efficient data transfer operation of the ADSL USB network 300 by preventing data transfer events where the ADSL line data rate exceeds the USB bus bandwidth which would thereby result in data loss and loss of throughput (i.e., bottle-necking), and methods of this management routine will be described in more detail below.

Also contained within the memory/storage 322 is an operating system 324 and software 326. The operating system 324, as is known in the art, plays a major role in the management and control of the software 326, as well as the bandwidth negotiation routine 312, and hardware components, such as the user interface circuitry 328, of the computer 306. Further, as is known in the art, the software 326 comprises programs that process data. It will be shown below that certain control signals and data obtained by processes of the operating system 324 and bandwidth negotiation routine 312 may be applied to the management of ADSL USB bandwidth negotiation in accordance with a preferred embodiment of the present invention.

Figure 4:
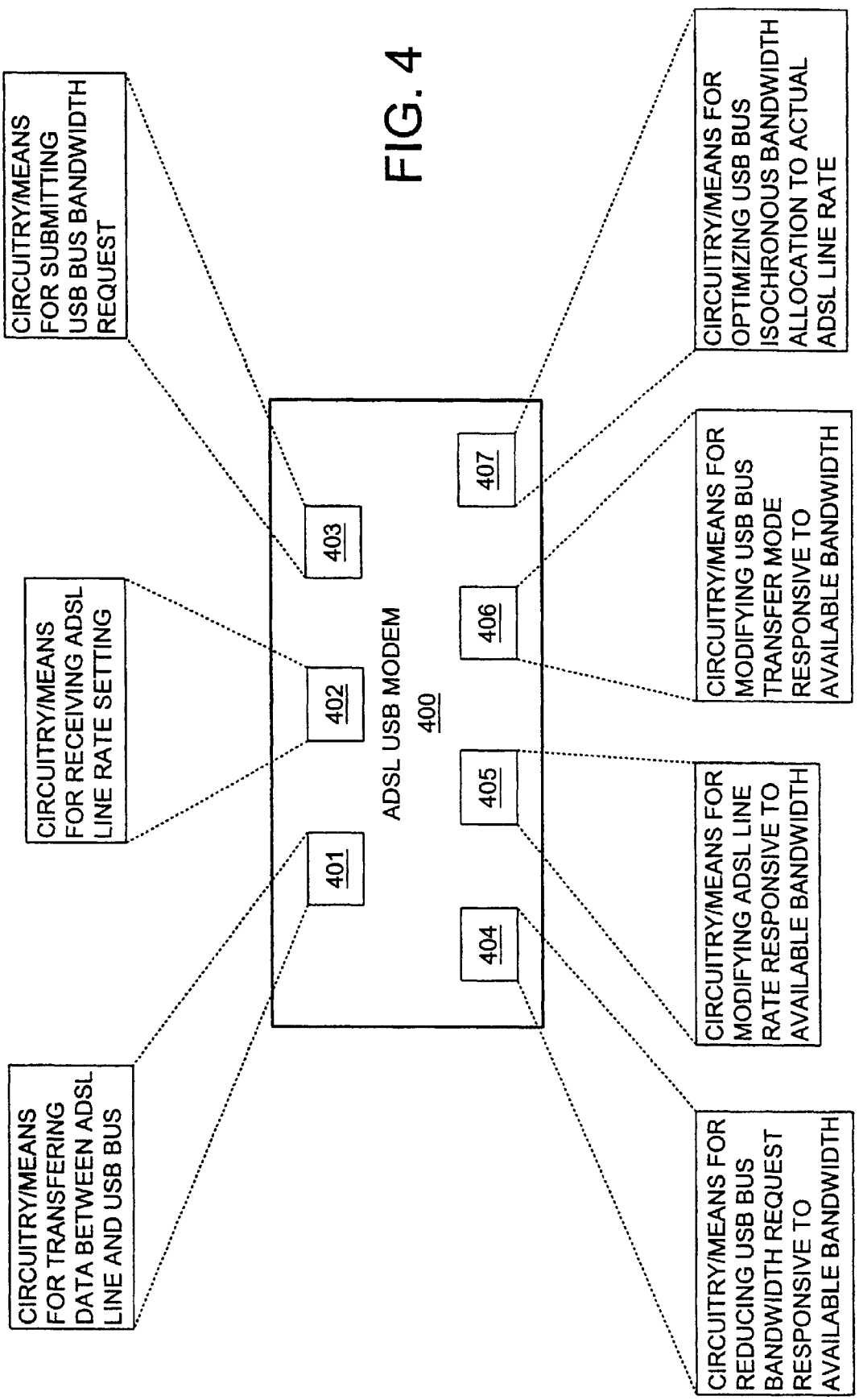
FIG. 4 is a block diagram of an ADSL USB modem in accordance with a preferred embodiment of the present invention.

Reference is now directed to FIG. 4, which shows a block diagram of an ADSL USB modem 400 in accordance with a preferred embodiment of the present invention. In this regard, the modem 400 comprises various circuitry or means 401–407 for performing various functions of the modem 400. Circuitry/means 401 is configured to transfer data between an ADSL line and a USB bus. Circuitry/means 402 is configured to receive an ADSL line setting which, for example, may be transmitted from a computer that is in communications with the ADSL USB modem via a USB bus. Circuitry/means 403 is configured to submit requests for USB bus bandwidth to a computer. In this regard, the circuitry/means 403 may submit requests for various types of bandwidth, such as isochronous mode or bulk mode bandwidth. It is noted that, in another preferred embodiment of the present invention, the function performed by circuitry/means 403 may be performed by the bandwidth negotiation routine 312 stored in the memory/storage 322 of the computer 306 (FIG. 3).

Circuitry/means 404 is configured to reduce a USB bus bandwidth request in response to the amount of bandwidth that is determined to be available on the USB bus by the circuitry/means 404. It is noted that the process of determining the amount of available USB bus bandwidth by circuitry/means 404 or other circuitry/means, described below, may involve receiving an acceptance from the computer of a submitted bandwidth request made, for example, by circuitry/means 403 as described above. The reduction of a bandwidth request by the circuitry/means 404 may be made based on a set increment value. This increment value may be a permanent setting stored within the circuitry/means 404. Alternatively, the increment value may be a variable setting that is received by the circuitry/means 404 from a computer. The reduction of a bandwidth request by the circuitry/means 404 may be based, alternatively, on a series of set values that are either permanently or temporarily stored in the circuitry/means 404. The set values that the reduced bandwidth requests are based on may have equal increments between them, or each set value may have a different increment between it and adjacent values.

Circuitry/means 405 is configured to modify an ADSL line rate in response to the amount of bandwidth that is determined to be available on the USB bus by the circuitry/means 405. The modification of the ADSL line rate may be made by a process of the circuitry/means 405 reporting a slower than actual maximum transfer rate capability and a lower than actual signal-to-noise ratio (SNR) to a DSLAM that is connected to the modem 400 via an ADSL line. Circuitry/means 406 is configured to modify the USB bus transfer mode of the modem 400 in response to the amount of bandwidth that is determined to be available on the USB bus by the circuitry/means 406. In this regard, the circuitry/means 406 may, for example, modify the USB bus transfer mode of the modem 400 from isochronous to bulk based on the determination that no isochronous bandwidth is available.

Circuitry/means 407 is configured to optimize the USB bus isochronous bandwidth allocation to the actual ADSL line rate, thereby conserving available isochronous bandwidth on the USB bus for other USB devices. In this regard, the circuitry/means 407 may submit a request to modify the isochronous bandwidth allocation in response to a determination of the actual ADSL line rate (as opposed to the maximum ADSL line rate setting) which is made when the modem 400 completes training with a DSLAM. For example, if it is determined by the circuitry/means 407 that the amount of isochronous bandwidth allocated to the modem 400 is much greater than is required to support the actual ADSL line rate while avoiding bottle-necking, a request to reduce the isochronous bandwidth allocation is submitted. The request made circuitry/means 407 may be based on reducing the isochronous bandwidth so that it is greater that the actual ADSL line rate by a set margin or by a variable margin. In order to provide a sufficient margin between the ADSL line rate and the isochronous bandwidth allocation to avoid bottle-necking while also conserving available isochronous bandwidth on the USB bus 110 for other USB devices, it is preferable that the amount of isochronous bandwidth requested by circuitry/means 407 be 5% greater than the ADSL line rate setting. But, it is noted that the margin may be dependent on other factors in the ADSL USB network, such as the amount and type of buffering utilized. So, for example, a margin of 4% or 6% greater than the ADSL line rate may be applicable in some cases.

In FIG. 4, the circuitry/means 401–407 are represented by individual blocks for illustrative purposes. It should be understood that the circuitry/means 401–407 may comprise one or more structures, designs, or architectures. For example, the circuitry/means 401–407 may comprise a single architecture of processing circuitry, such as a microprocessor chip, that is configured to perform the various functions of the circuitry/means 401–407 of the modem 400 collectively. As another example, the circuitry/means 401–407 may comprise several architectures of processing circuitry that are in electrical communications, such as a processing system comprising a central processing unit (CPU) chip in electrical communications with a plurality of integrated circuit (IC) chips that perform various functions or processes. Many other structures, designs, or architectures may be utilized to implement the circuitry/means 401–407 of the modem 400 within the scope of the present invention, as will be apparent to one skilled in the art.

It should be further understood, in regard to the circuitry/means 401–407 of FIG. 4, that the functionality of the circuitry/means 401–407 may be implemented by one or more various forms of executable code or logic. For example, the functionality of the circuitry/means 401–407 may be implemented by firmware logic that is permanently stored in the circuitry/means 401–407, such as in the case of a read-only memory (ROM) device. As another example, the functionality of the circuitry/means 401–407 may be implemented by software code that is temporarily stored in the circuitry/means 401–407, such as in the case of a random-access memory (RAM) device. The functionality of the circuitry/means 401–407 may be implemented by many other forms of code or logic within the scope of the present invention, as will be apparent to one skilled in the art.

Figure 5:
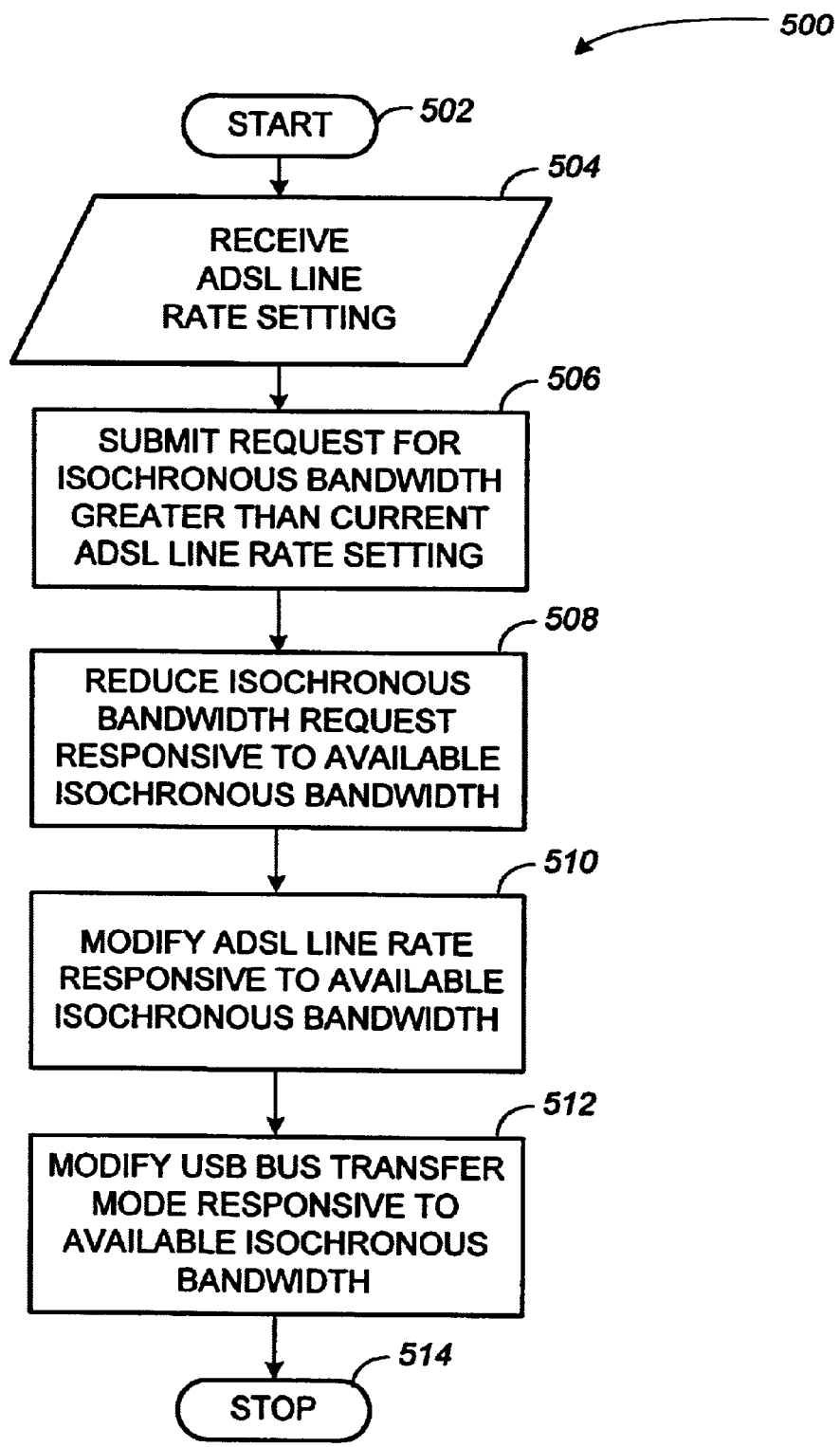
FIG. 5 is a flowchart diagram of an ADSL USB bandwidth negotiation method that may be applied, for example, to the network of FIG. 3 to manage the ADSL USB bandwidth negotiation of an ADSL USB modem in accordance with one embodiment of the present invention.

Moving now to FIG. 5, a flowchart diagram is shown of an ADSL USB bandwidth negotiation method 500 that may be applied, for example, to the network 300 of FIG. 3 to manage the ADSL USB bandwidth negotiation of an ADSL USB modem in accordance with one embodiment of the present invention. In this regard, the ADSL USB bandwidth negotiation method 500 will be described in reference to its possible application to the ADSL USB network 300 of FIG. 3 to facilitate the description of the present invention. It should be understood that the bandwidth negotiation method 500 may be applied to many other network configurations besides that of FIG. 3, as will be apparent to one skilled in the art.

The bandwidth negotiation method 500 begins with step 502 which is designated as "start". From the start step 502, the method 500 next comprises step 504 in which the ADSL USB modem 302 receives a setting for the ADSL line rate. The ADSL line rate, typically described in Mbps, describes the data transmission speed on the ADSL line between the DSLAM 102 and the modem 302, and this setting is used to limit the ADSL line rate that the modem 302 negotiates with the DSLAM 102. The setting for the ADSL line rate may be determined by the processing of the bandwidth negotiation routine 312 and/or software 326 that is stored in the memory/storage 322 of the computer 306. Alternatively, the setting for the ADSL line rate may be determined based on data input via the user interface 328 or the USB interface 330 from some peripheral device, for example, a keyboard. The ADSL line rate setting is received by the modem 302 from the computer 306 via the USB bus 110. The setting may be stored within the bandwidth negotiation routine 312 that is stored in the memory/storage 322 of the computer 306. The setting may also be stored within the bandwidth negotiation routine 334 that is stored in the memory 318 of the controller 316 of the modem 302. The ADSL line rate setting is also used by the modem 302 and the computer 306 in performing the bandwidth negotiation method 500.

After step 504 the method 500 comprises step 506 in which a request is submitted to the computer 306 for an allocation of isochronous bandwidth on the USB bus 110 that is greater than the ADSL line rate setting received during step 504. This step 506 may involve the processing of the bandwidth negotiation routine 334 stored in the memory 318 of the controller 316 of the modem 302 and/or the processing of the bandwidth negotiation routine 312 stored in the memory/storage 322 of the computer 306. Further, the step 306 may involve communications between the computer 306 and the modem 302 via the USB bus 110.

The amount of isochronous bandwidth requested in step 506 may be greater than the ADSL line rate setting by a set margin value. Alternatively, the amount of isochronous bandwidth requested may be greater than the ADSL line rate setting by a variable margin value that is determined based on parameters within the ADSL USB network 300, such as the ADSL line rate or the amount of data to be transferred. In order to provide a sufficient margin between the ADSL line rate and the isochronous bandwidth allocation to avoid bottle-necking while also conserving available isochronous bandwidth on the USB bus 110 for other USB devices, it is preferable that the amount of isochronous bandwidth requested in step 506 be 5% greater than the ADSL line rate setting. But, it is noted that the margin may be dependent on other factors in the ADSL USB network, such as the amount and type of buffering utilized. So, for example, a margin of 4% or 6% greater than the ADSL line rate may be applicable in some cases.

Following step 506, the ADSL USB bandwidth negotiation method 500 comprises step 508 in which the computer 306, or alternatively the modem 302, modifies the isochronous bandwidth request submitted in step 506 in response to the amount of isochronous bandwidth that is available on the USB bus 110 for allocation to the modem 302. This step 508 may involve the processing of the bandwidth negotiation routine 334 stored in the memory 318 of the controller 316 of the modem 302 and/or the processing of the bandwidth negotiation routine 312 stored in the memory/storage 322 of the computer 306. Further, the step 506 may involve communications between the computer 306 and the modem 302 via the USB bus 110.

Following step 508, the ADSL USB bandwidth negotiation method 500 comprises step 510 in which the computer 306, or alternatively the modem 302, modifies the ADSL line rate in response to the amount of isochronous bandwidth that is available on the USB bus 110 for allocation to the modem 302. In this regard, the modem 302 may modify the ADSL line rate to a slower rate in response to the amount of isochronous bandwidth available on the USB bus 110 being less than the current ADSL line rate setting. This step 510 may involve processing of the bandwidth negotiation routine 334 that is stored within the memory 310 of the controller 316 of the modem 302. Alternatively, this step 510 may involve the processing of the bandwidth negotiation routine 312 stored in the memory/storage 322 of the computer 306.

Following step 510, the ADSL USB bandwidth negotiation method 500 comprises step 512 in which the computer 306, or alternatively the modem 302, modifies the USB bus transfer mode in response to the amount of isochronous bandwidth that is available on the USB bus 110 for allocation to the modem 302. In this regard, the transfer mode may be modified from isochronous transfer mode to bulk transfer mode in response to a lack of availability of isochronous bandwidth on the USB bus 110. This step 512 may involve processing of the bandwidth negotiation routine 334 that is stored within the memory 310 of the controller 316 of the modem 302. Alternatively, this step 510 may involve the processing of the bandwidth negotiation routine 312 stored in the memory/storage 322 of the computer 306. After the completion of step 512, the process steps of the bandwidth negotiation method 500 are complete and the method 500 proceeds to the final step 514 which is designated "stop". When the method 500 reaches the stop step 514, data transfer between the DSLAM 102 and the computer 306 via the network of the ADSL line 108, the modem 302, and the USB bus 110 may occur without the problem of bottle-necking.

Figure 6:
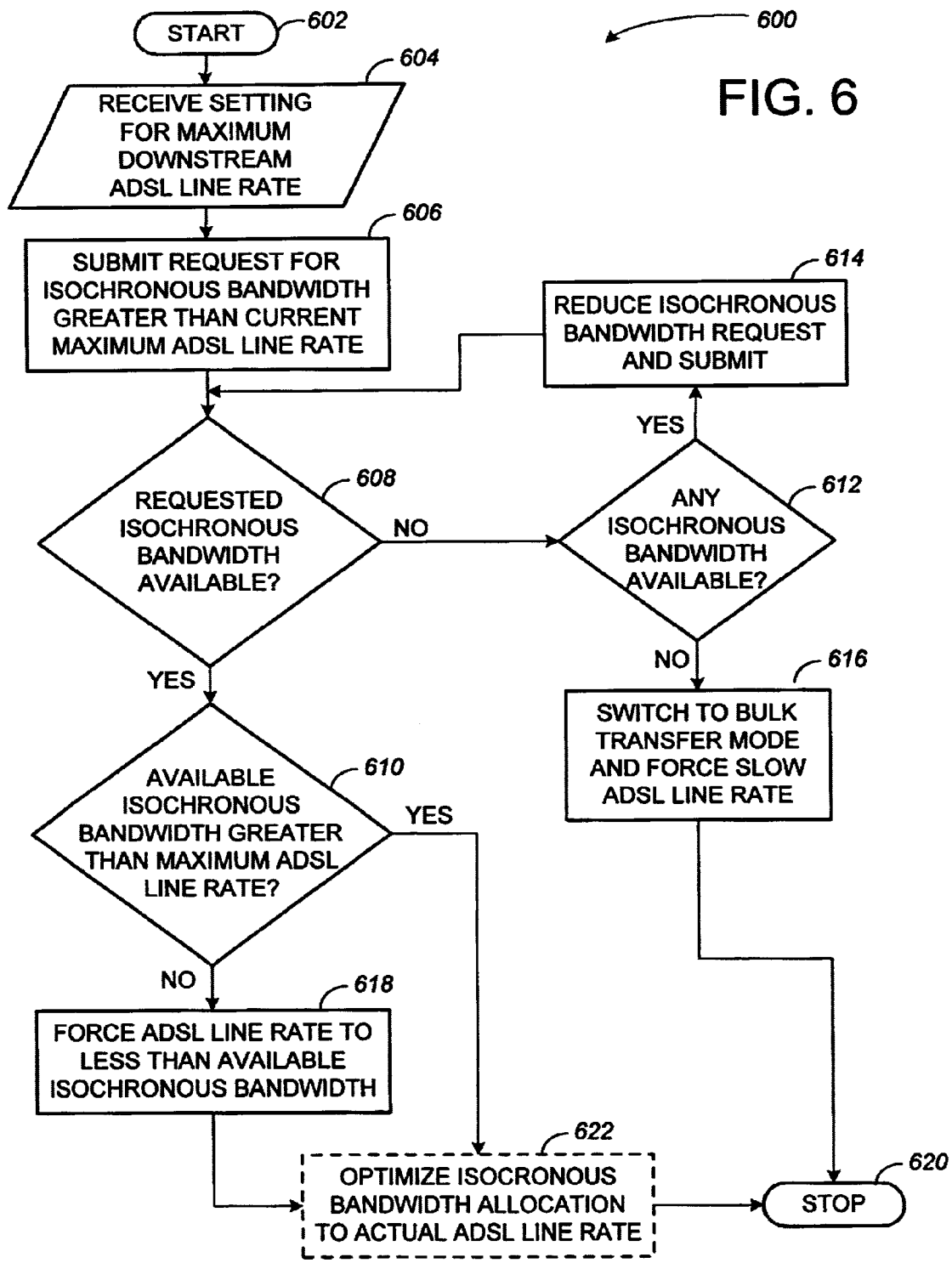
FIG. 6 is a flowchart diagram of an ADSL USB bandwidth negotiation method that may be applied, for example, to the network of FIG. 3 to manage the ADSL USB bandwidth negotiation of an ADSL USB modem in accordance with a preferred embodiment of the present invention.

Moving now to FIG. 6, a flowchart diagram is shown of an ADSL USB bandwidth negotiation method 600 that may be applied, for example, to the network 300 of FIG. 3 to manage the ADSL USB bandwidth negotiation of an ADSL USB modem in accordance with a preferred embodiment of the present invention. In this regard, the ADSL USB bandwidth negotiation method 600 will be described in reference to its possible application to the ADSL USB network 300 of FIG. 3 to facilitate the description of the present invention. It should be understood that the bandwidth negotiation method 600 may be applied to many other network configurations besides that of FIG. 3, as will be apparent to one skilled in the art.

The bandwidth negotiation method 600 begins with step 602 which is designated as "start". From the start step 602, the method 600 next comprises step 604 in which the ADSL USB modem 302 receives a setting for the maximum downstream ADSL line rate. The maximum downstream ADSL line rate, typically described in Mbps, describes the data transmission speed on the ADSL line between the DSLAM 102 and the modem 302, and this setting is used to limit the ADSL line rate that the modem 302 negotiates with the DSLAM 102. Typically, the maximum downstream ADSL line rate is the fastest available line rate of the ADSL line and may also be known as the subscription line rate. The setting for the maximum downstream ADSL line rate may be determined by the processing of the bandwidth negotiation routine 312 and/or software 326 that is stored in the memory/storage 322 of the computer 306. Alternatively, the setting for the maximum downstream ADSL line rate may be determined based on data input via the user interface 328 or the USB interface 330 from some peripheral device, for example, a keyboard. The maximum downstream ADSL line rate setting is received by the modem 302 from the computer 306 via the USB bus 110. The setting may be stored within the bandwidth negotiation routine 312 that is stored in the memory/storage 322 of the computer 306. The setting may also be stored within the bandwidth negotiation routine 334 that is stored in the memory 318 of the controller 316 of the modem 302. The maximum downstream ADSL line rate setting is also used by the modem 302 in performing the bandwidth negotiation method 600.

After step 604 the method 600 comprises step 606 in which a request is submitted to the computer 306 for an allocation of isochronous bandwidth on the USB bus 110 that is greater than the maximum downstream ADSL line rate setting received during step 604. The step 606 may involve the processing of the bandwidth negotiation routine 334 stored in the memory 318 of the controller 316 of the modem 302 and/or the processing of the bandwidth negotiation routine 312 stored in the memory/storage 322 of the computer 306. Further, the step 606 may involve communications between the computer 306 and the modem 302 via the USB bus 110.

The amount of isochronous bandwidth requested in step 606 may be greater than the maximum downstream ADSL line rate setting by a set margin value. Alternatively, the amount of isochronous bandwidth requested may be greater than the maximum downstream ADSL line rate setting by a variable margin value that is determined based on parameters within the ADSL USB network 300, such as the ADSL line rate or the amount of data to be transferred. In order to provide a sufficient margin between the ADSL line rate and the isochronous bandwidth allocation to avoid bottlenecking while also conserving available isochronous bandwidth on the USB bus 110 for other USB devices, it is preferable that the amount of isochronous bandwidth requested in step 606 be 5% greater than the ADSL line rate setting. But, it is noted that the margin may be dependent on other factors in the ADSL USB network, such as the amount and type of buffering utilized. So, for example, a margin of 4% or 6% greater than the ADSL line rate may be applicable in some cases.

Following step 606, the ADSL USB bandwidth negotiation method 600 comprises step 608 in which the computer 306, or alternatively the modem 302, determines if the isochronous bandwidth requested during step 606 is available on the USB bus 110. This step 608 may involve the processing of the bandwidth negotiation routine 334 stored in the memory 318 of the controller 316 of the modem 302 and/or the processing of the bandwidth negotiation routine 312 stored in the memory/storage 322 of the computer 306.

Further, the step 306 may involve communications between the computer 306 and the modem 302 via the USB bus 110. If it is determined that the requested bandwidth is available, then the bandwidth negotiation method proceeds to step 610. But, if it is determined that the requested bandwidth is not available, then the bandwidth negotiation method proceeds to step 612. It is noted that the determination may involve a controlling component of the computer 306 or the modem 302 receiving an acceptance signal from, for example, the USB interface circuitry 330 of the computer 306.

In the step 610 of the bandwidth negotiation method 600, it is determined if the bandwidth that was determined to be available in step 608 is greater than the maximum ADSL line rate setting that was determined in step 604. This step 610 may involve a comparison process of the maximum ADSL line rate setting to the available isochronous bandwidth on the USB bus 110 performed by the processing of the bandwidth negotiation routine 334 stored in the memory 318 of the controller 316 of the modem 302 and/or by the processing of the bandwidth negotiation routine 312 stored in the memory/storage 322 of the computer 306. In the step 612 of the bandwidth negotiation method 600, it is determined if there is any isochronous bandwidth available on the USB bus after it has been determined in step 608 that the amount of isochronous bandwidth requested in step 606 is not available. This step 612 may involve the processing of the bandwidth negotiation routine 334 stored in the memory 318 of the controller 316 of the modem 302 and/or the processing of the bandwidth negotiation routine 312 stored in the memory/storage 322 of the computer 306. Further, the step 612 may involve communications between the computer 306 and the modem 302 via the USB bus 110.

If, in step 612, it is determined that there is isochronous bandwidth available, the bandwidth negotiation method 600 proceeds to step 614. In step 614, the current isochronous bandwidth request, which is initially made in step 606, is reduced, and the modified request is submitted the computer 306 in the same manner that the request is made in step 606. The reduction and submittal of the isochronous bandwidth request may involve the processing of the bandwidth negotiation routine 334 stored in the memory 318 of the controller 316 of the modem 302 and/or the processing of the bandwidth negotiation routine 312 stored in the memory/ storage 322 of the computer 306. Further, the step 614 may involve communications between the computer 306 and the modem 302 via the USB bus 110. The reduction of the isochronous bandwidth request may be made based on a set increment value. This increment value may be a permanent setting within the bandwidth negotiation routine 312 of the modem 302. Alternatively, the increment value may be a variable setting that is set by the processing of software 326 within the computer 306 or based on data input via the user interface 328 or the USB interface 330 from some peripheral device, for example, a keyboard.

The reduction of the isochronous bandwidth request in step 614 may be based, alternatively, on a series of set values contained within the bandwidth negotiation routine 312 that are either permanently set or that are set based on processing (e.g., of software 326) or data input (e.g., via the user interface 328) to the computer 306. The set values that the reduced bandwidth request is based on may have equal increments between them, or each set value may have a different increment between it and adjacent values. After the isochronous bandwidth is reduced and submitted in step 614, the bandwidth negotiation method 600 loops back to step 608 in which it is determined if the requested isochronous bandwidth is available, as was described above.

Continuing on, with regards to step 612, if it is determined that there is no isochronous bandwidth available, the bandwidth negotiation method 600 proceeds to step 616. In step 616, the request of isochronous bandwidth is discontinued and instead bandwidth requests for bulk transfers are submitted. As discussed above, bulk transfers are dynamically scheduled on a per frame basis based on the available bandwidth on the USB bus 110, whereas isochronous transfers are made based on a guaranteed allocation of isochronous bandwidth. Furthermore, in step 616 the modem 302 "forces" the ADSL line rate to a slow setting, for example, less than 1 Mbps. Preferably, the ADSL line rate is forced to 0.5 Mbps. This is done because, considering that there is no isochronous bandwidth available on the USB bus 110 (i.e., the isochronous bandwidth allocation has been exhausted by other USB devices), there will be a limited amount of bandwidth left on the USB bus for bulk transfers. The modem 302 forces the ADSL line rate to a slow setting by reporting a slower than actual maximum transfer rate capability and a lower than actual signal-to-noise ratio (SNR). This action by the modem 302 causes the DSLAM 102 to choose a slower downstream line rate than the available maximum downstream line rate when the modem 302 and DSLAM 102 exchange operating parameters during training (i.e., the process by which the modem 302 and the DSLAM 102 determine the correct protocols and transmission speeds to establish a connection). After the completion of step 616, the process steps of the bandwidth negotiation method 600 are complete and the method 600 proceeds to the final step 620 which is designated "stop".

Returning now to discussion of step 610, if the bandwidth that was determined to be available in step 608 is greater than the maximum ADSL line rate setting, then the process steps of the bandwidth negotiation method 600 are complete and the method 600 proceeds to the final step 620 which is designated "stop". But, if the bandwidth that was determined to be available in step 608 is not greater than the maximum ADSL line rate setting, then the bandwidth negotiation method 600 proceeds to step 618. In step 618, the modem 302 forces the ADSL line rate to a slower setting value than the available isochronous bandwidth on the USB bus 110 that has been allocated to the modem 302. The ADSL line rate is forced to a slower value in the same manner that the ADSL line rate is modified in step 616. That is, the modem 302 forces the ADSL line rate to a slower setting by reporting a slower than actual maximum transfer rate capability and a lower than actual SNR, which thereby causes the DSLAM 102 to choose a slower downstream line rate than the available maximum when the modem 302 and DSLAM 102 train. After the completion of step 618, the process steps of the bandwidth negotiation method 600 are complete and the method 600 proceeds to the final step 620 which is designated "stop". Once the method 600 reaches the stop step 620, data transfer from the DSLAM 102 to the computer 306 via the network of the ADSL line 108, the modem 302, and the USB bus 110 may occur without the problem of bottle-necking.

As shown in FIG. 6, the method 600 may include an additional step 622 in which the isochronous bandwidth allocation is optimized to the actual ADSL line rate. This optimization step 622 provides the conservation of available isochronous bandwidth on the USB bus for other USB devices As shown, this step 622 may occur before the stop step 620 after proceeding from either step 610 or 618. In this step 622, the modem 302 completes the training process with the DSLAM 102 and the actual ADSL line rate (as opposed to the maximum ADSL line rate setting) is determined by the modem 302 or the computer 306. In response to this determination, a request may be submitted to modify the isochronous bandwidth allocation to the modem 302. For example, if the amount of isochronous bandwidth allocated to the modem 302 is much greater than what is required to support the actual ADSL line rate while avoiding bottle-necking, a request to reduce the isochronous bandwidth allocation is submitted. The step 622 may involve the processing of the bandwidth negotiation routine 334 stored in the memory 318 of the controller 316 of the modem 302 and/or the processing of the bandwidth negotiation routine 312 stored in the memory/storage 322 of the computer 306. Further, the step 622 may involve communications between the computer 306 and the modem 302 via the USB bus 110.

The request made in step 622 may be based on reducing the isochronous bandwidth so that it is greater that the actual ADSL line rate by a set margin or by a variable margin. In order to provide a sufficient margin between the ADSL line rate and the isochronous bandwidth allocation to avoid bottle-necking while also conserving available isochronous bandwidth on the USB bus 110 for other USB devices, it is preferable that the amount of isochronous bandwidth requested in step 606 be 5% greater than the ADSL line rate setting. But, it is noted that the margin may be dependent on other factors in the ADSL USB network, such as the amount and type of buffering utilized. So, for example, a margin of 4% or 6% greater than the ADSL line rate may be applicable in some cases.

The bandwidth negotiation routine 312, 334 and related software 326, which comprise ordered listings of executable instructions for implementing logical functions, can be embodied in any computer-readable medium for use by or in connection with an instruction processing system, apparatus, or device, such as a computer-based system, processor-containing system, or other system that can fetch the instructions from the instruction processing system, apparatus, or device and execute the instructions. In the context of this document, a "computer-readable medium" can be any means that can contain, store, communicate, propagate, or transport the program for use by or in connection with the instruction processing system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), or a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

The flowchart diagrams of the ADSL USB bandwidth negotiation method 500 and of the ADSL USB bandwidth negotiation method 600 described above and shown in FIGS. 5 and 6 of the present invention show the architecture, functionality, and operation of possible implementations of the present invention. In this regard, each block may represent a module, segment, or portion of code, which comprises one or more executable instructions for implementing the specified logical function(s). It should also be noted that in some alternative implementations, the functions noted in the blocks may occur out of the order shown.

It is emphasized that the above-described embodiments of the present invention, particularly any "preferred" embodiments, are merely possible examples of the implementations that are merely set forth for a clear understanding of the principles of the invention. It will be apparent to those skilled in the art that many modifications and variations may be made to the above-disclosed embodiments of the present invention without departing substantially from the spirit and principles of the invention. All such modifications and variations are intended to be included herein within the scope of the disclosure and present invention and protected by the following claims.

Therefore, having thus described the invention, at least the following is claimed:

1. A method for ADSL USB bandwidth negotiation by an ADSL USB modem, comprising the steps of:
   receiving a downstream ADSL line rate setting, said downstream ADSL line rate setting initially being a maximum value;
   submitting a USB bus isochronous bandwidth request to a computer, wherein said request is greater than said downstream ADSL line rate setting by a set margin value;
   reducing said isochronous bandwidth request in response to a first condition, wherein said step of reducing said isochronous bandwidth request comprises:
      determining if said isochronous bandwidth request is available;
      determining if any isochronous bandwidth is available in response to a determination that said isochronous bandwidth request is not available;
      reducing said isochronous bandwidth request in response to a determination that said isochronous bandwidth is available; and
      submitting a reduced isochronous bandwidth request to said computer;
   modifying said ADSL line rate setting in response to a second condition, wherein said step of modifying said ADSL line rate setting comprises:
      determining if said isochronous bandwidth request is available;
      determining if said isochronous bandwidth request is greater than said downstream ADSL line rate setting in response to a determination that said isochronous bandwidth request is available; and
      reducing said ADSL line rate setting in response to a determination that said isochronous bandwidth request is not greater than said downstream ADSL line rate setting; and
   modifying the USB bus transfer mode of said ADSL USB modem in response to a third condition, wherein said step of modifying the USB bus transfer mode of said ADSL USB modem comprises:
      determining if said isochronous bandwidth request is available;
      determining if any isochronous bandwidth is available in response to a determination that said isochronous bandwidth request is not available;
      requesting USB bus bulk transfer bandwidth in response to a determination that said isochronous bandwidth is not available; and
      reducing said ADSL line rate setting in response to a determination that said isochronous bandwidth is not available.

2. The method of claim 1, wherein said step of receiving comprises receiving a downstream ADSL line rate setting determined by the processing of software.

3. The method of claim 1, wherein said step of receiving comprises receiving a downstream ADSL line rate setting determined by manual input data.

4. The method of claim 1, further comprising the step of:
   optimizing said isochronous bandwidth in response to a fourth condition, wherein said step of optimizing comprises:
      determining an actual ADSL line rate;
      comparing said isochronous bandwidth to said actual ADSL line rate; and
      submitting a request to reduce said isochronous bandwidth in response to a
   determination than said isochronous bandwidth is greater than said actual ADSL line rate by more than a margin value.

5. The method of claim 1, wherein said step of reducing said isochronous bandwidth request comprises reducing said isochronous bandwidth request by a set increment value.

6. The method of claim 5, wherein said set increment value is a permanent setting stored in a memory of said modem.

7. The method of claim 5, wherein said set increment value is a variable setting determined by the processing of software.

8. The method of claim 5, wherein said set increment value is a variable setting determined by manual input data.

9. A system for the negotiation of ADSL and USB bandwidth in an ADSL USB network, comprising:
   a modem, wherein said modem comprises:
      circuitry configured to transfer data between an ADSL line and a USB bus;
      circuitry configured to receive a downstream ADSL line rate setting, wherein said downstream ADSL line rate setting is initially a maximum value;
      circuitry configured to submit a USB bus isochronous bandwidth request to a computer, said request being greater than said downstream ADSL line rate setting by a set margin value;
      circuitry configured to reduce said isochronous bandwidth request in response to a first condition of availability of said isochronous bandwidth, comprising:
         circuitry configured to determine if said isochronous bandwidth request is available;
         circuitry configured to determine if any isochronous bandwidth is available in response to a determination that said isochronous bandwidth request is not available;
         circuitry configured to reduce said isochronous bandwidth request in response to a determination that said isochronous bandwidth is available; and
         circuitry configured to submit a reduced isochronous bandwidth request to a computer;
      circuitry configured to modify said ADSL line rate setting in response to a second condition of availability of said isochronous bandwidth, comprising:
         circuitry configured to determine if said isochronous bandwidth request is available;
         circuitry configured to determine if said isochronous bandwidth request is greater than said downstream ADSL line rate setting in response to a determination that said isochronous bandwidth request is available;
         circuitry configured to reduce said ADSL line rate setting in response to a determination that said isochronous bandwidth request is not greater than said downstream ADSL line rate setting; and circuitry configured to modify the USB bus transfer mode of said modem in response to a third condition of availability of said isochronous bandwidth, comprising:

circuitry configured to determine if said isochronous bandwidth request is available;

circuitry configured to determine if any isochronous bandwidth is available in response to a determination that said isochronous bandwidth request is not available;

circuitry configured to request USB bus bulk transfer bandwidth in response to a determination that said isochronous bandwidth is not available; and circuitry configured to reduce said ADSL line rate setting in response to a determination that said isochronous bandwidth is not available; and circuitry configured to optimize said isochronous bandwidth in response to a fourth condition of availability of said isochronous bandwidth, comprising:

circuitry configured to determine an actual ADSL line rate;

circuitry configured to compare said isochronous bandwidth to said actual ADSL line rate; and circuitry configured to submit a request to reduce said isochronous bandwidth in response to a determination that said isochronous bandwidth is greater than said actual ADSL line rate by more than a margin value.

10. A method for ADSL USB bandwidth negotiation by an ADSL USB modem, comprising the steps of:

receiving an ADSL line rate setting;

submitting an isochronous bandwidth request to a computer, wherein said request is greater than said ADSL line rate setting;

reducing said isochronous bandwidth request in response to a first condition of availability of said isochronous bandwidth;

modifying said ADSL line rate setting in response to a second condition of availability of said isochronous bandwidth; and modifying the USB bus transfer mode of said ADSL USB modem in response to a third condition of availability of said isochronous bandwidth.

11. The method of claim 10, wherein said ADSL line rate setting is a downstream ADSL line rate setting, initially being a maximum value.

12. The method of claim 10, wherein said step of receiving comprises receiving an ADSL line rate setting determined by the processing of software.

13. The method of claim 10, wherein said step of receiving comprises receiving an ADSL line rate setting determined by manual input data.

14. The method of claim 10, wherein said isochronous bandwidth request is greater than said ADSL line rate setting by a set margin value.

15. The method of claim 10, further comprising the step of:

optimizing said isochronous bandwidth in response to a fourth condition of availability of said isochronous bandwidth, wherein said step of optimizing comprises:

determining an actual ADSL line rate;

comparing said isochronous bandwidth to said actual ADSL line rate; and submitting a request to reduce said isochronous bandwidth in response to a determination than said isochronous bandwidth is greater than said actual ADSL line rate by more than a margin value.

16. The method of claim 10, wherein said isochronous bandwidth request is greater than said ADSL line rate setting by a variable margin value determined based on parameters of the ADSL USB network comprising said ADSL USB modem.

17. The method of claim 10, wherein said step of reducing said isochronous bandwidth request comprises:

determining if said isochronous bandwidth request is available;

determining if any isochronous bandwidth is available in response to a determination that said isochronous bandwidth request is not available;

reducing said isochronous bandwidth request in response to a determination that said isochronous bandwidth is available; and submitting a reduced isochronous bandwidth request to said computer.

18. The method of claim 17, wherein said step of reducing said isochronous bandwidth request comprises reducing said isochronous bandwidth request by a set increment value.

19. The method of claim 18, wherein said set increment value is a permanent setting stored in a memory of said modem.

20. The method of claim 18, wherein said set increment value is a variable setting determined by the processing of software.

21. The method of claim 18, wherein said set increment value is a variable setting determined by manual input data.

22. The method of claim 10, wherein said step of modifying said ADSL line rate setting comprises:

determining if said isochronous bandwidth request is available;

determining if said isochronous bandwidth request is greater than said ADSL line rate setting in response to a determination that said isochronous bandwidth request is available; and reducing said ADSL line rate setting in response to a determination that said isochronous bandwidth request is not greater than said ADSL line rate setting.

23. The method of claim 10, wherein said step of modifying the USB bus transfer mode of said ADSL USB modem comprises:

determining if said isochronous bandwidth request is available;

determining if any isochronous bandwidth is available in response to a determination that said isochronous bandwidth request is not available;

requesting USB bus bulk transfer bandwidth in response to a determination that said isochronous bandwidth is not available; and reducing said ADSL line rate setting in response to a determination that said isochronous bandwidth is not available.

24. A modem for the negotiation of ADSL and USB bandwidth in an ADSL USB network, comprising:

means for transferring data between an ADSL line and a USB bus;

means for receiving an ADSL line rate setting;

means for submitting an isochronous bandwidth request to a computer, said request being greater than said ADSL line rate setting;

means for reducing said ADSL line rate setting in response to a first condition of availability of isochronous bandwidth;

means for modifying said ADSL line rate setting in response to a second condition of availability of isochronous bandwidth; and means for modifying the USB bus transfer mode of said modem in response to a third condition of availability of isochronous bandwidth.

25. The modem of claim 24, wherein:

said first condition is that said isochronous bandwidth request is not available and that isochronous bandwidth is available;

said second condition is that said isochronous bandwidth request is available and that said isochronous bandwidth request is greater than said ADSL line rate setting; and said third condition is that said isochronous bandwidth request is not available and that isochronous bandwidth is not available.

26. A system for the negotiation of ADSL and USB bandwidth in an ADSL USB network, comprising:

a modem, wherein said modem comprises:

circuitry configured to transfer data between an ADSL line and a USB bus;

circuitry configured to receive an ADSL line rate setting;

circuitry configured to submit an isochronous bandwidth request to a computer, said request being greater than said ADSL line rate setting;

circuitry configured to reduce said isochronous bandwidth request in response to a first condition of availability of isochronous bandwidth;

circuitry configured to modify said ADSL line rate setting in response to a second condition of availability of isochronous bandwidth; and circuitry configured to modify the USB bus transfer mode in response to a third condition of availability of isochronous bandwidth.

27. The system of claim 26, wherein:

said first condition is that said isochronous bandwidth request is not available and that isochronous bandwidth is available;

said second condition is that said isochronous bandwidth request is available and that said isochronous bandwidth request is greater than said ADSL line rate setting; and said third condition is that said isochronous bandwidth request is not available and that isochronous bandwidth is not available.

* * * * *